May 29, 1956     J. H. BOETJER     2,747,594
COMBINATION SAFETY PRESSURE AND VACUUM RELEASE DEVICE
Filed July 20, 1954
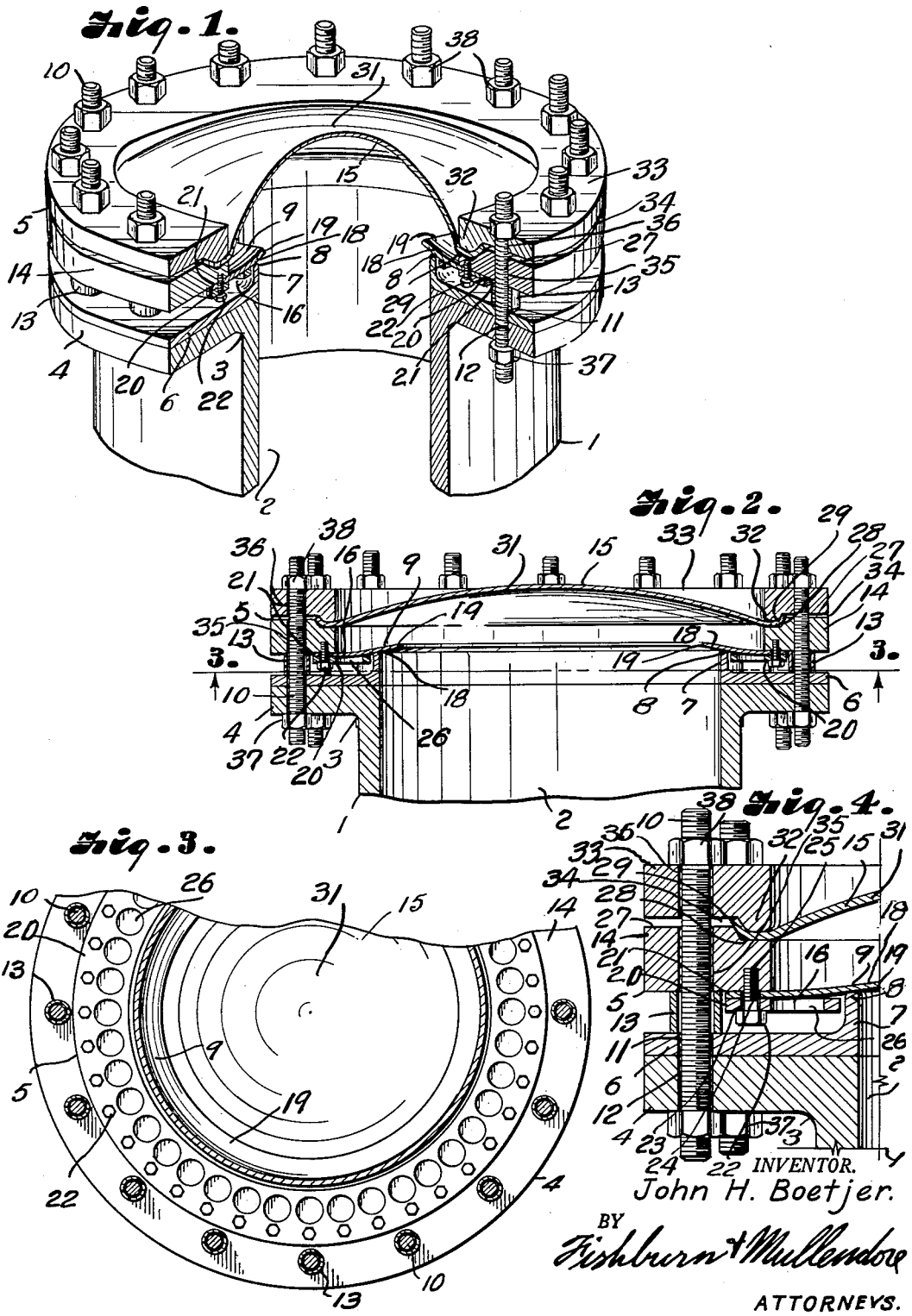
INVENTOR.
John H. Boetjer.
BY
Fishburn + Mullendore
ATTORNEYS.

United States Patent Office 2,747,594
Patented May 29, 1956

2,747,594

COMBINATION SAFETY PRESSURE AND VACUUM RELEASE DEVICE

John H. Boetjer, Independence, Mo., assignor to Black, Sivalls & Bryson, Inc., Kansas City, Mo., a corporation of Delaware Application July 20, 1954, Serial No. 444,547

4 Claims. (Cl. 137—71)

This invention relates to a combination safety pressure and vacuum release device.

For example, vessels containing liquids and gases under working pressures, are subject to destructive pressures when the internal pressure exceeds the safe working pressure for which the vessel is designed and some means must be provided to protect the vessel by releasing the excessively high internal pressures. This has been accomplished by providing the vessel with a frangible safety head which allows release of pressure above the safe working pressure of the vessel. Also such vessels are subject to collapse by external pressures when excessively low pressures occur within the vessel as when the vessel is being emptied or for other reasons a vacuum is produced within the vessel.

It is obvious that when the vessel is subject to vacuum the frangible element of the safety head is subject to reversal under atmospheric pressure. It is true that supports may be used to prevent reversal but when the safety devices are of large diameter such supports are not effective.

It is therefore a principal object of the present invention to provide a single combination safety pressure and vacuum release device for protecting the vessel from pressure differentials and to protect the safety pressure device and vessel from low pressure differentials.

Another object of the invention is to provide a combination safety device which has a resilient valve operable under pressure differential to relieve vacuum pressures and a frangible diaphragm which ruptures when the internal pressures rise above the safe working pressure of the vessel.

Other objects of the invention are to provide a device of this character which quickly and safely relieves undesirable pressure differentials through vacuum and pressure-operated elements; to provide a combination safety device which affords a large flow capacity and which functions within close limits of the release pressures for which they are designed.

It is a further object of the invention to provide a combination vacuum and pressure device which is operable responsive to relatively small pressure differentials.

In accomplishing these and other objects of the present invention, I have provided improved structure, the preferred form of which is illustrated in the accompanying drawing wherein:

Fig. 1 is a perspective view of a combination vacuum and pressure release device embodying the features of the present invention.

Fig. 2 is a diametrical section through the device.

Fig. 3 is a section through the device on a line 3—3 of Fig. 2.

Fig. 4 is an enlarged fragmentary section through one side of the safety device to better illustrate the construction thereof.

Referring more in detail to the drawing:

1 designates, for example, a vessel such as used in retaining a fluid and which has a safe working pressure differential within which the internal pressures are retained and relieved when the pressure differentials become excessive or a vacuum tends to build up within the vessel, as when the vessel is being emptied of fluid or when the fluid contracts under change in temperature. The vessel is provided with a relief opening 2 that is encircled by a collar 3 having an annular laterally projecting flange 4 for mounting a safety device 5 embodying the features of the present invention.

The safety device 5 includes a ring member 6 preferably conforming in inner and outer diameters with the relief opening 2 and the flange 4, respectively. The ring member 6 has an integral collar-like flange 7 encircling the relief opening 2 and forming a relatively narrow annular seat 8 for a resilient vacuum release valve 9 later to be described. The ring member 6 is clamped to the flange 4 by fastening devices such as threaded studs 10 that extend through openings 11 therein and through registering openings 12 in the flange. The fastening devices are arranged in spaced relation about the marginal portion of the ring and carry spacing sleeves 13 that are sleeved upon the studs and which have a height substantially corresponding with the height of the collar-like flange 7 for spacing a clamping ring 14 which carries the vacuum release valve 9 and forms a seat for the pressure relief element 15. The outer diameter of the clamping ring 14 substantially conforms to the outer diameter of the flange 4 but the inner diameter is larger than the diameter of the flange 7 to form an annular space 16 therebetween through which external pressure may pass for relieving vacuum pressures within the vessel.

The vacuum release member 9 includes a normally flat ring 17 formed of resilient material and which is of a size to close the space 16, provide an outer marginal portion for attachment to the clamping ring 14 and an inner marginal portion 18 for contact with the seat 8. The inner marginal portion preferably projects inwardly over the opening 2 in the form of an annular lip 19. The member 9 is preferably supported from sagging into the space 16 by a substantially rigid ring 20 that cooperates with the ring 14 to clamp the outer marginal portion 21 of the valving element 9 therebetween when cap screws 22 are inserted through openings 23 and 24 of the supporting ring 20 and marginal portion 21, respectively, and screwed into internally threaded sockets 25 of the clamping ring 14 (Fig. 4). The supporting ring 20 is preferably carried slightly below the annular seat 8 so as to create sufficient inherent tension within the valving member to maintain seating of the lip portion 19 under the normal pressures within the vessel. The supporting portion of the ring is provided with a series of openings 26 that permit external pressures to act upon the valve member 9. The opposite face 27 of the clamping ring 14 has an inset annular seat 28 that seats a marginal edge 29 of the pressure relief element 15 which has a frangible concavo-convex portion 31 and which cooperates with the release valve 9 in normally closing outlet from the opening 2 of the vessel. The marginal portion 29 of the diaphragm is retained in clamped engagement with its seat by an annular rib 32 on a complimentary clamping ring 33 which conforms with the clamping ring 14, the rib 32 being of sufficient depth so as to make a space 34 between the clamping rings 14 and 33. The clamping rings having openings 35 and 36 which pass the studs 10, the clamping action of the rings being effected by nuts 37 and 38 applied to the respective ends of the studs 10.

When the device is in use, excessive vacuum is relieved in the vessel by the external air pressure raising the valve 9 from the seat 8. Lifting of the valve 9 to relieve the vacuum also protects the frangible diaphragm and eliminates the possibility of conditions occurring within the vessel that might cause reversal of the diaphragm under external pressure. As soon as the interior approaches the exterior pressure, the valve 9 effects a closure and prevents loss of vapor or other fluid from the vessel.

In case the internal pressure should rise above the safe-working pressure of the vessel or the pressure for which the diaphragm was designed, the concavo-convex 31 portion of the diaphragm splits and peels back under the pressure to effect release thereof.

From the foregoing it is obvious that I have provided a combination vacuum and pressure release device which protects a vessel when differential pressures reach the point which might cause collapsing or bursting of the vessel.

What I claim and desire to secure by Letters Patent is:

1. A combination safety pressure and vacuum release device including a valve ring having an annular seat encircling a relief opening formed by said ring, clamping rings of larger diameter encircling an opening in outwardly spaced relation with said annular seat, means spacing the clamping rings from the valve seat to form a passageway in connection with said space, a frangible diaphragm covering the flow opening and having its marginal portion engaged between the clamping rings to cover the flow opening, and a flexible valve ring having an outer marginal portion connected with the clamping rings and having an inner marginal portion engaging said annular seat to cooperate with the diaphragm in maintaining normally a pressure within a vessel to which the device is to be connected when in use.

2. A combination safety pressure and vacuum release device including a valve ring having an annular seat encircling a relief opening formed by said ring, clamping rings of larger diameter encircling an opening in outwardly spaced relation with said seat, means spacing the clamping rings from the valve seat to form a passageway in connection with said latter opening, a frangible diaphragm covering said openings and having a marginal portion engaged between the clamping rings, a valve ring formed of flexible material and having an outer marginal portion connected with the clamping rings and having an inner marginal portion engaging said seat to close said latter opening and cooperate with the frangible diaphragm in maintaining a pressure within a vessel to which the device is connected when in use, and a supporting ring for the valve ring to support the flexible portion of said valve ring under positive pressures in the vessel.

3. A combination vacuum and pressure-release device including a collar forming a flow opening and having an annular seat surrounding the flow opening, diaphragm retaining means spaced outwardly from said annular seat and encircling the flow opening to provide an opening from atmosphere, a flexible ring fixed to the diaphragm retaining means and having bearing support on the annular seat for closing the opening from atmosphere and adapted to unseat by atmospheric pressure when pressure in the flow opening drops below atmospheric pressure, and a frangible diaphragm carried by said diaphragm retaining means for covering said flow opening including the flexble ring and for cooperating with the flexible ring in maintaining a working pressure in the flow opening and relieving pressure when the pressure in the flow opening reaches a predetermined maximum.

4. A combination vacuum and pressure-release device including a collar forming a flow opening and having an annular seat surrounding the flow opening, diaphragm retaining means spaced outwardly from said annular seat and encircling the flow opening means spacing said retaining means from the collar to cooperate with the outward spacing from said seat to provide an opening from atmosphere, a flexible ring fixed to the diaphragm retaining means and having bearing support on the annular seat for closing the opening from atmosphere and adapted to unseat by atmospheric pressure when pressure in the flow opening drops below atmospheric pressure, and a frangible diaphragm carried by said diaphragm retaining means for covering said flow opening including the flexible ring and for cooperating with the flexible ring in maintaining a working pressure in the flow opening and relieving pressure when the pressure in the flow opening reaches a predetermined maximum.

References Cited in the file of this patent

UNITED STATES PATENTS

| 1,571,022 | Obert | Jan. 26, 1926 |
| 2,317,923 | Lebo | Apr. 27, 1943 |
| 2,369,018 | Cavicchioli | Feb. 6, 1945 |
| 2,562,672 | Kunert | July 31, 1951 |
| 2,619,113 | Myers | Nov. 25, 1952 |